United States Patent Office 2,702,757
Patented Feb. 22, 1955

2,702,757

REFINING TITANIUM BEARING MATERIALS

Monroe J. Bahnsen, deceased, late of Lakewood, Ohio, by Jane Bahnsen, executrix, Lakewood, Ernest H. Goda, East Cleveland, and Glenn H. McIntyre, Cleveland Heights, Ohio, assignors to Ferro Corporation, a corporation of Ohio No Drawing. Continuation of application Serial No. 657,902, March 28, 1946. This application July 28, 1951, Serial No. 239,192

1 Claim. (Cl. 106—312)

This invention is a continuation of our invention Serial Number 657,902 filed March 28, 1946, and now abandoned.

This invention relates to a new product rich in compounds of titanium and especially useful as a smelter addition agent or component in the manufacture of porcelain enamel frit.

Titanium oxide has been used in the manufacture of porcelain enamels but usually the same has been the so-called "pigment" grade prepared by any one of several prior art processes. This pigment type material, while extremely valuable in organic coating materials such as paints, because of its tremendous hiding power and other properties is not particularly suitable for use in the manufacture of porcelain enamels. In the first place, this material is quite expensive and in the second place, its small particle size has required elaborate precautions and pre-mixing procedures before it could be used satisfactorily in the production of glasses and porcelain enamel.

One of the most economical and widely available sources of titanium is rutile. That mineral, however, contains sufficient quantities of impurities such as compounds of chromium and vanadium so as to render it incapable of use directly as a source of titanium compounds, since such impurities have a discoloring effect on the enamels when fired onto the work.

It is a principal object of our invention to provide a titanium bearing material which may be used as a smelter component in the manufacture of porcelain enamels, which material is derived from rutile by a process which is quite inexpensive, while at the same time eliminating sufficiently the impurities such as the chromium and vanadium compounds.

It is a further object of our invention to provide an improved porcelain enamel characterized by the inclusion therein as a smelter component, a product prepared in accordance with our invention.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises the provision of a new composition useful as a smelter component in the manufacture of porcelain enamel frit, which composition may be defined as the product derived by sintering rutile with an amount of soda ash in excess of that required to convert the titania content of the rutile to the tri-titanate, comminuting the sintered mass, and then water washing such comminuted sintered mass sufficiently so as to leach therefrom substantially all of the chromates and vanadates, leaving as the end product a material which may be utilized directly as a titanium rich source of material to be included as a smelter component in porcelain enamels.

As previously indicated, the starting material used in the production of our improved product is rutile. Any commercial grade of that mineral may be employed since the process for the production of our improved product will result in the removal therefrom of such impurities as would otherwise be found detrimental to the porcelain enamel. The precise composition of the product which we have thus provided for the purposes above stated is difficult to determine exactly. For this reason, it is believed preferable to identify the product by its method of production, which in the main includes the following principal steps.

The rutile is first admixed with an amount of soda ash as previously indicated in excess of that required to convert the titania content of the rutile to the tri-titanate. After the rutile and soda ash are thoroughly intermixed, the mixture is sintered at a temperature of from about 1550° F. to about 2000° F. for a length of time sufficient to complete the reaction. A time of from ½ to 8 hours may be used for this sintering operation depending upon the mass of the material being sintered and the heat input into the furnace.

During the sintering operation the above specified major components of the sintered mass may have admixed therewith a minor amount of a material such as sodium chloride which is effective to lower the melting point of the mass and thus facilitate the sintering operation. Additionally or alternatively, the sintered mass may have included therein a minor amount of an oxidizing agent such as sodium nitrate or sodium chlorate.

The oxidizing agent and the material used to lower the melting point of the mass will, as indicated, be used in minor amounts, usually amounts up to 25% by weight of the amount of rutile used will be found sufficient.

After the mass has been sintered in the manner and under the conditions above specified, it is then cooled and this step is preferably accomplished by dumping the hot sintered mass into water, which quenching action has the effect of breaking up the sintered mass and also performing a desirable initial leaching step.

After the sintered mass thus projected into the water bath has been permitted to cool, it is then comminuted, preferably by being ball-milled with water to a fineness such that at least 95% will pass through a 325 mesh screen.

At this point it should be observed that the fineness of the starting material rutile has an important bearing on certain of the conditions of the process required to produce our new product. The fineness of subdivision of titanium compounds therein has a direct bearing on the length of time required during the sintering operation for the reaction between the rutile and the soda ash to go to completion. For this reason I prefer to employ as a starting material rutile which has been pulverized to such an extent that substantially all of it will pass through a 325 mesh screen.

Instead of employing a ball-mill and thus grinding the sintered mass in water to a fineness such that at least 95%, or preferably substantially all, will pass through a 325 mesh screen, we may for larger batches and large scale commercial operations use a dry grinding procedure such as that performed by well known available apparatus.

After the sintered mass has thus been comminuted, it is then water washed preferably using hot water until the water washed solution is completely colorless. In this connection it should be noted that the original wash water is a deep yellow due to the solution therein of chromates formed during the sintering operation.

After the product has been washed until there is no longer any trace of color in the wash water, the product is then dried and is ready for use as a smelter component in the manufacture of porcelain enamel.

As illustration of the process above explained, reference may be had to the following example.

100 parts of rutile having approximately the following analysis:

| | |
|---|---|
| $TiO_2$ | 95.0 |
| $SiO_2$ | 1.9 |
| $ZrO_2$ | 1.5 |
| $Fe_2O_3$ | 1.0 |
| $Cr_2O_3$ | 0.4 |
| $V_2O_5$ | 0.2 | was thoroughly mixed with 75 parts of soda ash containing about 44 parts of $Na_2O$ and with 15 parts of sodium nitrate containing about 5.45 parts of Na₂O. The ratio of TiO₂ to Na₂O was thus about 95 to 49.45.

The mixture above identified was sintered at a temperature of about 1650° F. in an oxidizing atmosphere for a period of about 6 hours, after which the sintered mass was thrown hot into water, allowed to cool and ball-milled with water until substantially all of the solid material passed through a 325 mesh screen. The water was then removed by filtration and the milled mass subjected to a continuous washing until the wash water was absolutely colorless. The dried product showed the following approximate analysis:

| | |
|---|---|
| TiO₂ | 76.0 |
| Na₂O | 17.7 |
| SiO₂ | 1.5 |
| H₂O | 4.0 |
| Fe₂O₃ | 0.5 |

As previously indicated, our invention includes not only the provision of this improved titanium bearing material which may be used as a smelter component in the manufacture of porcelain enamel frit, but such invention also includes porcelain enamels made by the utilization of such materials since such enamels have an improved color because of the substantial absence of any amounts of chromium and vanadium compounds which otherwise would have a tendency to discolor the enamel.

As illustration of the types of porcelain enamels within which our improved material may be employed as a component, reference may be had to the following table which gives in parts by weight the various materials which are added to the smelter and smelted under customary conditions.

| | Parts by Weight | |
|---|---|---|
| | Composition A | Composition B |
| Sand (SiO₂) | 1,275 | 720 |
| Borax (Dehydrated) | 221 | 212 |
| Soda Ash | 425 | 282 |
| Sodium nitrate | 51 | 183 |
| Antimony oxide Sb₂O₃ | | 252 |
| Sodium silico fluoride Na₂SiF₆ | 390 | 210 |
| Product of this invention | 136 | 107 |
| Fluorspar CaF₂ | | 77 |
| Feldspar | 128 | 400 |
| Sodium sulfate | 35 | |

Composition A above should be smelted for a period of from 3 to 4 hours at a temperature of from 2000° F. to 2200° F. and Composition B should be smelted for a period of from 3 to 4 hours at a temperature of from 2100° F. to 2300° F. The frit compositions given above, or more accurately the components thereof other than the material of this invention, will be recognized as more or less conventional acid resisting enamels and are given merely as illustrative of porcelain enamels generally within which the material of this invention will be found useful.

Other modes of applying the principle of the invention may be employed, change being made as regards the details described, provided the features stated in any of the following claims or the equivalent of such be employed.

We therefore particularly point out and distinctly claim as our invention:

The process of making a composition, useful as a smelter component in the manufacture of porcelain enamel, which consists essentially of sintering a commercial rutile bearing minor amounts of chromium and vanadium with from about 50% to 100% by weight of commercial soda ash in the presence of up to 25% by weight of the rutile of a material selected from the class consisting of sodium chlorate and sodium nitrate at a temperature from about 1550° F. to about 2000° F., comminuting the sintered mass, and then water washing such comminuted sintered mass sufficiently to leach out substantially all of the chromates and vanadates.

References Cited in the file of this patent

UNITED STATES PATENTS

| | | |
|---|---|---|
| 1,929,521 | Ryan | Oct. 10, 1933 |
| 2,496,993 | Goda | Feb. 7, 1950 |

OTHER REFERENCES

Perry, "Chemical Engineer's Handbook," 2nd edition, 1941, page 1256.